Oct. 5, 1954 — A. W. FEIERTAG — 2,690,751
CLASSIFICATION CARD
Filed July 7, 1952 — 2 Sheets-Sheet 1

"0"

"1" OR "A"

"2" OR "B"

"3" OR "C"

"4" OR "D"

"5" OR "E"

"6" OR "F"

"7" OR "G"

"8" OR "H"

"9" OR "I"

"10" OR "J"

"11" OR "K"

ARTHUR W. FEIERTAG
INVENTOR.

BY
Meelin and Hanscom
ATTORNEYS

Oct. 5, 1954
A. W. FEIERTAG
2,690,751
CLASSIFICATION CARD
Filed July 7, 1952
2 Sheets-Sheet 2
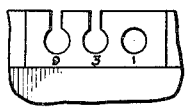 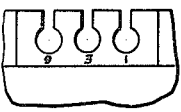 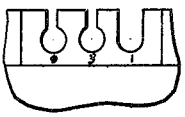 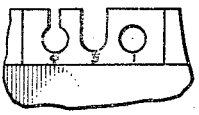 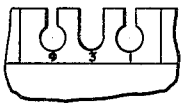
"12" OR "L"    "13" OR "M"    "14" OR "N"    "15" OR "O"    "16" OR "P"
FIG. 14.    FIG. 15.    FIG. 16.    FIG. 17.    FIG. 18.
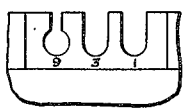 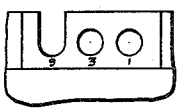 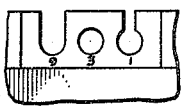 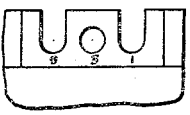 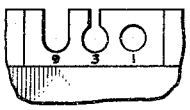
"17 OR "Q"    "18" OR "R"    "19" OR "S"    "20" OR "T"    "21" OR "U"
FIG. 19.    FIG. 20.    FIG. 21.    FIG. 22.    FIG. 23.
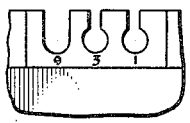 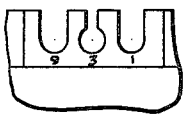 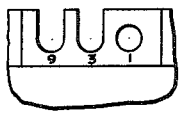 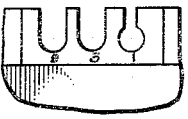 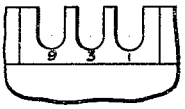
"22" OR "V"    "23" OR "W"    "24" OR "X"    "25" OR "Y"    "26" OR "Z"
FIG. 24.    FIG. 25.    FIG. 26.    FIG. 27.    FIG. 28.
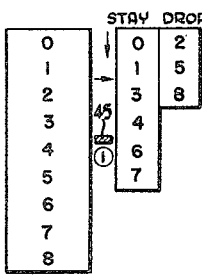 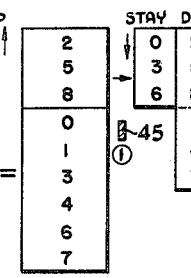 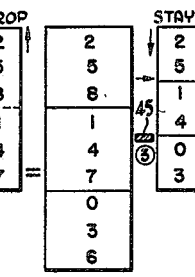 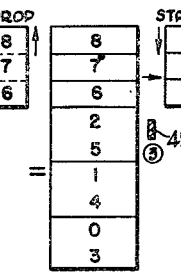 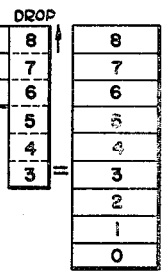
FIG. 29.   FIG. 30.   FIG. 31.   FIG. 32.   FIG. 33.   FIG. 34.   FIG. 35.   FIG. 36.   FIG. 37.
ARTHUR W. FEIERTAG
*INVENTOR.*
BY
Meelin and Hanscom
ATTORNEYS Patented Oct. 5, 1954

2,690,751

UNITED STATES PATENT OFFICE 2,690,751

CLASSIFICATION CARD

Arthur W. Feiertag, Athens, Ohio, assignor, by mesne assignments, to Royal McBee Corporation, a corporation of New York Application July 7, 1952, Serial No. 297,437

10 Claims. (Cl. 129—16.1)

This invention relates to cards or other flat bodies of sheet material adapted to be sorted or classified. More particularly, the invention relates to marginally perforated cards, sheets, checks and the like, which may be sorted, separated or classified for accounting or statistical purposes, particularly cards that can be sequentially sorted.

When groups of indicium comprising both letters of the alphabet and numerals, such as catalog designations, license numbers, etc. are to be coded on cards of the above type, such groups must be indirectly coded, because it is not possible to directly code as many as 26 classifications (the number of letters in the alphabet) in a single field. In conventional practice, it is necessary to assign a straight numeric code number to each catalog or license number in order to identify it in terms of punchings or notchings on a card. This means that it is necessary to code the code, and thereafter decode the code in order to determine what the catalog or license numbers are involved. This is a costly and time-consuming operation.

A main object of the present invention is to provide a classification card having fields which can be directly coded to identify groups of indicium of the above type, and particularly to provide a small field which can be so coded, thus permitting relatively large groups of indicium of the above type to be coded on a single card.

Various other objects of the present invention will be apparent from the following description taken in connection with the accompanying drawings, wherein:

Figs. 2 through 28 are fragmentary views of a card edge, showing fields of a record card embodying the concepts of the present invention coded to indicate a "0" classification and 26 different value classifications.

Figs. 29 through 37 show diagrammatically part of the steps employed in sequentially sorting a stack of cards embodying the concepts of the present invention.

Figure 1:
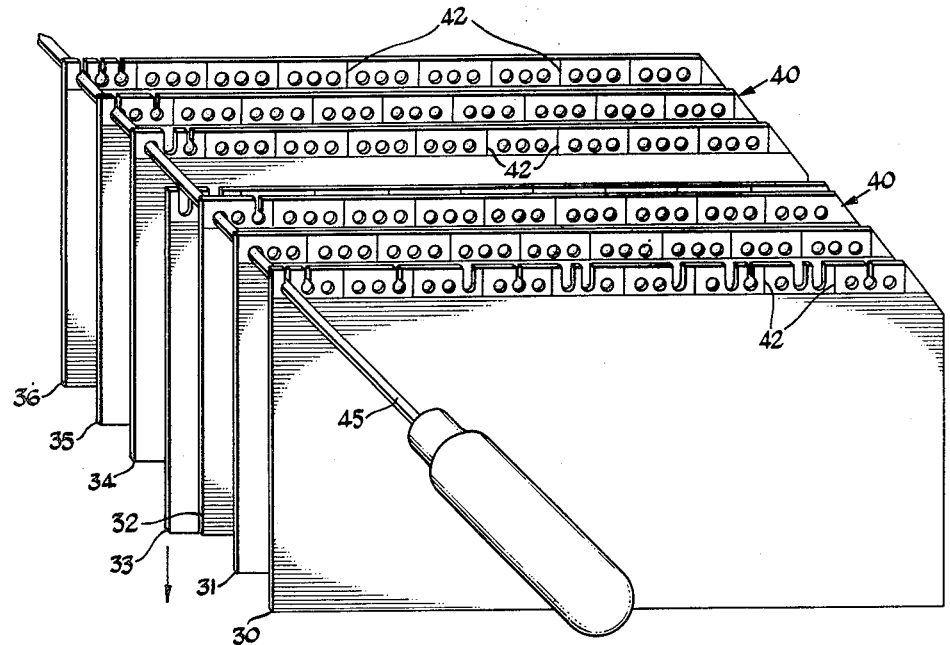
Fig. 1 is a view of a stack of cards embodying the concepts of the present invention and having a special needle extending through the aligned "9" perforations, the cards being shown in exaggerated spaced relationship for purposes of clarity of illustration.
Figure 2:
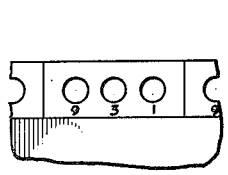
Figure 3:
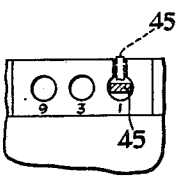
Figure 4:
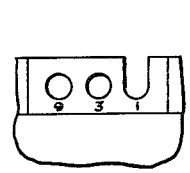
Figure 5:
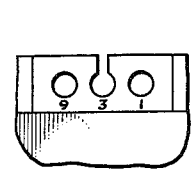
Figure 6:
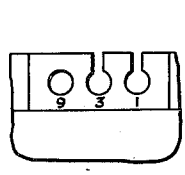
Figure 7:
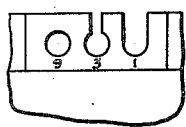
Figure 8:
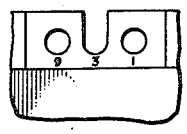
Figure 9:
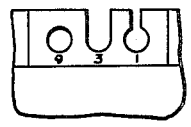
Figure 10:
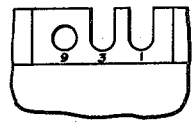
Figure 11:
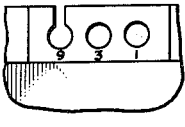
Figure 12:
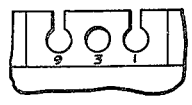
Figure 13:
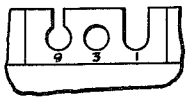

Referring to the accompanying drawings wherein similar reference characters designate similar parts throughout, a stack of cards embodying the concepts of the present invention is disclosed in Fig. 1, the cards being designated by the reference numerals 30 through 36, reading from front to back. Although the cards shown have code areas extending along only one margin of each card, similar fields can be provided on other margins thereof, or different types of fields can be provided on the cards on other margins thereof, or on the same margins on which fields embodying the concepts of the present invention appear.

In general, the record card disclosed has a single row of perforations generally entitled 40 parallel to a card edge, the top edge in the illustration shown. The card is provided with lines 42 which divide the perforations into fields of only three perforations each. Each field bears the numerical indicium "1" next to the right-hand perforation, the numerical indicium "3" next to the middle perforation, and the numerical indicium "9" next to the left-hand perforation.

The fields are specially notched with two kinds of notches, a wide notch and a narrow notch, and are sorted by the use of a special flat bladed sorting needle 45, which has a blade width slightly less than that of a wide notch, but greater than that of a narrow notch, and a blade thickness slightly less than that of a narrow notch. It is apparent that when the needle is arranged horizontally, it may pass through a wide notch but not a narrow notch and thus effect a separation of cards having their fields wide notched, in the perforations through which the needle extends, from the cards having the corresponding perforations narrow notched or unnotched. When the needle blade is arranged vertically, i. e., maintained bodily stationary but turned 90 degrees, the blade may pass through a narrow notch, but of course not through an unnotched field, to effect a further separation.

By a combination of wide and narrow notches, a field of only three perforations wide and one perforation deep (three perforations in all) can be coded to indicate 26 different value classifications. This means that a field of the character disclosed can be notched to indicate any letter of the alphabet and of course to indicate digits, so that designations comprising both letters and numerals can be directly coded in a field.

Referring to Figs. 2 through 28, it is apparent that a "0" classification is identified by leaving the field unnotched; a "1" or "A" classification is identified by narrow notching the "1" perforation to the card edge; a "2" or "B" classification is identified by wide notching the "1" perforation to the card edge; a "3" or "C" is identified by narrow notching the "3" perforation to the card edge; a "4" or "D" classification is identified by narrow notching the "1" and "3" perforations to the card edge; a "5" or "E" classification is identified by wide notching the "1" perforation to the card edge and narrow notching the "3" perforation to the card edge; a "6" or "F" classification is identified by wide notching the "3" perforation to the card edge; a "7" or "G" classification is identified by narrow notching the "1" perforation to the card edge and wide notching the "3" perforation to the card edge; an "8" or "H" classification is identified by wide notching both the "1" and "3" perforations to the card edge; a "9" or "I" classification is identified by narrow notching the "9" perforation to the card edge.

Notching to identify classifications from "10" or "J" to "17" or "Q" is self-explanatory from the above description taken in connection with Figs. 12 through 19. Any classification of this group is obtained by an additive value system; for instance, the classification of "17" or "Q" is obtained by narrow notching the "9" perforation to the card edge (a value of nine), and then wide notching the "1" and "3" perforations to the card edge (a value of eight) so that the total numerical value is seventeen, which represents a "Q" or "17" classification.

An "18" classification is obtained by wide notching the "9" perforation to the card edge (see Fig. 20), and it follows from the above description and from Figs. 21 through 28 that classifications of "19" or "S" to "26" or "Z" are obtained by notching a field for a value of eighteen and then further notching to attain the total value desired. For instance, a "24" or "X" classification is obtained by wide notching the "9" perforation to the card edge (a value of eighteen), and wide notching the "3" perforation to the card edge (a value of six), the total value being twenty-four, which indicates a "24" or "X" classification.

With cards notched according to the above plan, it is apparent that if the flat sorting needle is turned horizontally, such as disclosed in Fig. 1, and inserted through the "1" or "A" aligned perforations, said needle will be unable to pass through narrow notches or unnotched marginal material. Thus, every card which is narrow from its "1" perforation (through which the needle extends) to the card edge (such as "1" or "A" cards, "4" or "D" cards, "7" or "G" cards, etc.) will not drop, and every card unnotched from its "1" perforation (through which the needle extends) to the card edge (such as "0" cards, "3" or "C" cards, "6" or "F" cards, etc.) will not drop. However, every card which is wide notched from its "1" perforation (through which the needle extends) to the card edge (such as "2" or "B" cards, "5" or "E" cards, "8" or "H" cards, etc.) will drop. When the needle blade is turned vertically, every card which is narrow notched from its "1" or "A" perforation (through which the needle extends) to the card edge will drop.

Referring to Fig. 1, it is evident that the flat sorting needle 45 has been inserted with its blade turned horizontally through the aligned "9" perforations in the extreme left-hand row of fields. It is also evident that the first card 30 has been coded, in the field through which the needle extends, for indicating an "L" or "12" classification; that the corresponding field of card 31 has been left blank to indicate a "0" classification; that the corresponding field of card 32 has been coded to indicate a "1" or "A" classification; that the corresponding field of card 33 has been coded to indicate a "20" or "T" classification; that card 34 has its corresponding field coded to indicate a "7" or "G" classification; card 35 has its corresponding field coded to indicate a "10" or "J" classification; and that card 36 has its corresponding field coded to indicate a "13" or "M" classification.

Fig. 1 shows the cards as if the needle had been raised or conversely the support for the cards had been dropped so that cards having their fields, through which the needle extends, wide notched from their "9" perforations to the card edge, are separated. It is apparent that only card 33 will drop. However, when the needle is turned 90 degrees to dispose the blade thereof vertically, cards 30, 35 and 36 will drop (each being narrow notched from its "9" perforation to card edge) and cards 31, 32 and 34 will remain on the needle (each having its "9" perforation unnotched).

Card 30, in contrast to the other cards, has the fields along its top margin coded to identify a particular indicium grouping of letters and numerals, namely, "L123XB78C" reading from left to right. The nine fields shown have been coded to indicate respectively the nine indicium comprising the group above identified. It is apparent from the coding of card 30 that any particular combination of letters and numerals can be coded in a card of the present invention.

In order to sequentially sort a stack of cards coded to represent classifications including both numbers and letters, a preliminary sort is first effected to separate the stack into three portions. This is accomplished by running the needle, flat side horizontal, through the aligned "9" perforations of a particular row of fields, and the needle and cards separated to effect a separation of every card which is wide notched from its "9" perforation (through which the needle extends) to the card edge. It is apparent that the cards coded from "18" or "R," which is the classification represented by wide notching the "9" perforation to the card edge, to "26" or "Z" will drop from the stack. Then leaving the needle within the cards, the needle is turned to dispose the blade vertically so that every card which is narrow notched from its "9" perforation (through which the needle extends) will drop, this group including cards notched to indicate "9" or "I" through "17" or "Q" classifications, leaving on the needle the "0" cards and the "1" or "A" to "8" or "H" cards.

Figs. 29 through 37 show how a sequential sort can be carried out on one portion of stack, that portion including the "0" cards and the "1" or "A" to "8" or "H" cards. The "0" classification of course has no significance to letter classification. The block in Fig. 29 indicates a stack of unsorted cards which have been purposely arranged in inverse order to that desired, i. e., "8" to "0" instead of "0" to "8," to clearly show how sequential sorting is effected. For purposes of convenience in illustration the cards are identified by their numerical rather than alphabetical designations, i. e., "3," "4" or "5" instead of a "C," "D," or "E," but it will be apparent that the result to be attained, sequential sorting, is the same however the cards are considered. The remaining blocks in the other figures depict how the cards are progressively sorted and rearranged. It is assumed that the observer is looking down on the top edges of the stack of cards, and the digits "1" through "8" are intended to indicate one or more cards bearing these classifications (or equivalent letter classifications). The unsorted cards are in practice intermixed, but the present showing is believed to be an effective demonstration.

Beginning with Fig. 29, the needle 45 is run through the aligned "1" perforations of the particular rows of fields being sorted, with the blade disposed in a horizontal position so that the "0," "1," "3," "4," "6" and "7" cards stay on the needle (the horizontally disposed needle blade being unable to pass through the narrow notches or the unnotched marginal card material), whereas the "2," "5" and "8" cards will drop (because their "1" perforations are wide notched), see Fig. 30. The vertically disposed arrows indicate that the dropped cards are placed behind the cards which have stayed on the needle, so that the stack is then disposed in the relationship shown in Fig. 31.

Leaving the needle threaded through the cards, the needle blade is turned to its vertical position, so that when lifted the "0," "3," and "6" cards stay on the needle (being unnotched in this zone) whereas the "2," "5" and "8," and the "1," "4" and "7" cards will drop. The horizontal dotted lines in Fig. 32, in the dropped section indicate that the "2," "5" and "8" cards will be disposed behind the "1," "4" and "7" cards, because of the relative dispositions of these groups of cards as shown in Fig. 31. When the dropped cards have been moved to the back of the stack, the cards of the stack will be disposed in relative positions shown in Fig. 33.

The needle blade is then turned horizontally and run through the "3" perforations (of the same field) and the cards and needle separated. It will be noted in Fig. 34, that the "6," "7" and "8" cards will drop and again the dotted horizontal lines indicate the disposition of the dropped cards relative to one another. It is evident that the "8" cards will be behind the "7" cards, and the "7" cards behind the "6" cards. When the dropped cards are arranged behind the cards which have stayed on the needle, the disposition of the cards will be that as shown in Fig. 35.

Leaving the needle threaded through the cards, the needle blade is turned vertically and lifted so that the "3," "4," "5," "6," "7" and "8" cards will drop, as shown in Fig. 36, and will be disposed in relationship shown by the dotted lines, i. e., the "3" cards first, the "4" cards second, etc. The "0," "1" and "2" cards will remain and as is apparent they will be in numerical ascending order. When the dropped cards in Fig. 36 have been arranged behind the stack, as shown in Fig. 37, it is apparent that the cards in the stack are arranged in numerical or sequential order.

The second group of cards, i. e., representing "9" or "I" to "17" or "Q" classifications, can be similarly sorted, by inserting the needle horizontally through the "1" perforations, separating the cards and needle, and putting the dropped cards behind the stack, and leaving the needle in the stack turning it vertically and effecting further separation. Thereafter, when the dropped cards have been placed in the back of the stack, the needle is inserted through the "3" perforation horizontally, a separation and a re-grouping effected, and with the needle remaining in the cards it is turned vertically, a separation, and a re-grouping effected to produce a sequential arrangement of the cards. The third group of cards consisting of cards from "18" or "R" to "26" or "Z" can be similarly sorted and when this has been accomplished, the three groups of cards are in sequential order and can be combined, if desired, with the first group first and the third group last.

It is apparent that by the present invention a classification card has been provided which can be directly coded to indicate a catalog number, license number or the like comprising both letters and numerals. It is pointed out that all these advantages are attained with a very small field, one having three perforations arranged in a single row. When a stack of cards prepared according to the present invention is provided, they can be readily sequentially sorted as described hereinbefore.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A stack of classification cards, each having a single row of perforations disposed closely adjacent an edge thereof, said perforations being arranged in groups of three only, at least some of the groups being notched to identify alphabetical classifications, wherein each group identifying an "A," "J," or "S" classification has a narrow notch extending from its righthand perforation to the adjacent card edge, each group identifying a "B," "K" or "T" classification has a wide notch extending from its righthand perforation to the adjacent card edge, each group identifying a "C," "L" or "U" classification has a narrow notch extending from its middle perforation to the adjacent card edge, each group identifying a "D," "M" or "V" classification has narrow notches extending from its righthand and middle perforations to the adjacent card edge, each group identifying an "E," "N" or "W" classification has a wide notch extending from its righthand perforation and a narrow notch extending from its middle perforation to the adjacent card edge, each group identifying an "F," "O" or "X" classification has a wide notch extending from its middle perforation to the adjacent card edge, each group identifying a "G," "P" or "Y" classification has a wide notch extending from its righthand perforation and a wide notch extending from its middle perforation to the adjacent card edge, each group identifying an "H," "Q" or "Z" classification has wide notches extending from its righthand and middle perforations to adjacent card edge, each group identifying an "I" through "Q" classification has a narrow notch extending from its lefthand perforation to the adjacent card edge, and each group identifying an "R" through "Z" classification has a wide notch extending from its lefthand perforation to the adjacent card edge.

2. A stack of classification cards, each having a single row of perforations disposed closely adjacent an edge thereof, said perforations being arranged in groups of three only, at least some of the groups being notched to identify alphabetical classifications, wherein each group identifying an "A," "J" or "S" classification has a narrow notch extending from its righthand perforation to the adjacent card edge, each group identifying a "B," "K" or "T" classification has a wide notch extending from its righthand perforation to the adjacent card edge, each group identifying a "C," "L" or "U" classification has a narrow notch extending from its middle perforation to the adjacent card edge, each group identifying a "D,"

"M" or "V" classification has narrow notches extending from its righthand and middle perforations to the adjacent card edge, each group identifying an "E," "N" or "W" classification has a wide notch extending from its righthand perforation and a narrow notch extending from its middle perforation to the adjacent card edge, each group identifying an "F," "O" or "X" classification has a wide notch extending from its middle perforation to the adjacent card edge, each group identifying a "G," "P" or "Y" classification has a narrow notch extending from its righthand perforation and a wide notch extendnig from its middle perforation to the adjacent card edge, each group identifying an "H," "Q" or "Z" classification has wide notches extending from its righthand and middle perforations to the adjacent card edge, each group identifying an "I" through "Q" classification has a narrow notch extending from its lefthand perforation to the adjacent card edge, and each group identifying an "R" through "Z" classification has a wide notch extending from its lefthand perforation to the adjacent card edge, at least some of the groups being notched to identify numerical classifications, wherein each group identifying a "1" classification has a narrow notch extending from its righthand perforation to the adjacent card edge, each group identifying a "2" classification has a wide notch extending from its middle perforation to the adjacent card edge, each group identifying a "3" classification has a narrow notch extending from its middle classification to the adjacent card edge, each group identifying a "4" classification has narrow notches extending from its right hand and middle perforations to the adjacent card edge, each group identifying a "5" classification has a wide notch extending from its righthand perforation and a narrow notch extending from its middle perforation to the adjacent card edge, each group identifying a "6" classification has a wide notch extending from its middle perforation to the adjacent card edge, each group identifying a "7" classification has a narrow notch extending from its righthand perforation and a wide notch extending from its middle perforation to the adjacent card edge, each group identifying an "8" classification has wide notches extending from the righthand and middle perforations to the adjacent card edge, and each group identifying a "9" classification has a narrow notch extending from its lefthand perforation to the adjacent card edge.

3. A stack of classification cards, each having a single row of perforations disposed closely adjacent an edge thereof, said perforations being arranged in groups of three only, at least some of the groups being notched to identify alphabetical classifications wherein each group identifying an "A," "J" or "S" classification has a narrow notch extending from its righthand perforation to the adjacent card edge, each group identifying a "B," "K" or "T" classification has a wide notch extending from its righthand perforation to the adjacent card edge, each group identifying a "C," "L" or "U" classification has a narrow notch extending from its middle perforation to the adjacent card edge, each group identifying a "D," "M" or "V" classification has narrow notches extending from its righthand and middle perforations to the adjacent card edge, each group identifying an "E," "N" or "W" classification has a wide notch extending from its righthand perforation and a narrow notch extending from its middle perforation to the adjacent card edge, each group identifying an "F," "O" or "X" classification has a wide notch extending from its middle perforation to the adjacent card edge, each group identifying a "G," "P" or "Y" classification has a narrow notch extending from its righthand perforation and a wide notch extending from its middle perforation to the adjacent card edge, each group identifying an "H," "Q" or "Z" classification has wide notches extending from its righthand and middle perforations to the adjacent card edge, each group identifying an "I" through "Q" classification has a narrow notch extending from its lefthand perforation to the adjacent card edge, and each group identifying an "R" through "Z" classification has a wide notch extending from its lefthand perforation to the adjacent card edge, each card bearing adjacent the righthand perforation of each group the numerical indicia "1," adjacent the middle perforation of each group the numerical indicia "3," and adjacent the righthand perforation of each group the numerical indicia "9."

4. A stack of classification cards, each having a single row of perforations disposed closely adjacent an edge thereof, said perforations being arranged in groups of three only, at least some of the groups being notched to identify alphabetical classifications, wherein each group identifying an "A," "J" or "S" classification has a narrow notch extending from its righthand perforation to the adjacent card edge, each group identifying a "B," "K" or "T" classification has a wide notch extending from its righthand perforation to the adjacent card edge, each group identifying a "C," "L" or "U" classification has a narrow notch extending from its middle perforation to the adjacent card edge, each group identifying a "D," "M" or "V" classification has narrow notches extending from its righthand and middle perforations to the adjacent card edge, each group identifying an "E," "N" or "W" classification has a wide notch extending from its righthand perforation and a narrow notch extending from its middle perforation to the adjacent card edge, each group identifying an "F," "O" or "X" classification has a wide notch extending from its middle perforation to the adjacent card edge, each group identifying a "G," "P" or "Y" classification has a narrow notch extending from its righthand perforation and a wide notch extending from its middle perforation to the adjacent card edge, each group identifying an "H," "Q" or "Z" classification has wide notches extending from its righthand and middle perforations to the adjacent card edge, each group identifying an "I" through "Q" classification has a narrow notch extending from its lefthand perforation to the adjacent card edge, and each group identifying an "R" through "Z" classification has a wide notch extending from its lefthand perforation to the adjacent card edge, at least some of the groups being notched to identify numerical classifications, wherein each group identifying a "1" classification has a narrow notch extending from its righthand perforation to the adjacent card edge, each group identifying a "2" classification has a wide notch extending from its middle perforation to the adjacent card edge, each group identifying a "3" classification has a narrow notch extending from its middle classification to the adjacent card edge, each group identifying a "4" classification has narrow notches extending from its righthand and middle perforations to the adjacent card edge, each group identifying a "5" classification has a wide notch extending from its righthand perforation and a narrow notch extending from its middle perforation to the adjacent card edge, each group identifying a "6" classification has a wide notch extending from its middle perforation to the adjacent card edge, each group identifying a "7" classification has a narrow notch extending from its righthand perforation and a wide notch extending from its middle perforation to the adjacent card edge, each group identifying an "8" classification has wide notches extending from the righthand and middle perforations to the adjacent card edge, each group identifying a "9" classification has a narrow notch extending from its lefthand perforation to the adjacent card edge, each card bearing adjacent the righthand perforation of each group the numerical indicia "1," adjacent the middle perforation of each group the numerical indicia "3," and adjacent the righthand perforation of each group the numerical indicia "9."

5. A device for coding, sorting and segregating record cards in accordance with a regular sequential classification comprising a plurality of record cards, coding fields defined upon the cards, a group of coding apertures in each field consisting of three apertures arranged in a single row in spaced parallel relationship to a coding edge of a card, and notches of various widths extending from the coding edges of the cards to selected apertures within selected fields for coding each card with respect to a desired classification.

6. A device for coding, sorting and segregating record cards in accordance with a regular sequential classification comprising a plurality of record cards, coding fields defined upon the cards, a group of coding apertures in each field consisting of three apertures arranged in a single row in spaced parallel relationship to a coding edge of a card, and notches extending from the coding edge of the cards to selected apertures within selected fields for coding each card with respect to a desired classification, the width and positioning of the notches being varied in accordance with the classifications.

7. A device for coding, sorting and segregating record cards in accordance with an alphabetical classification comprising a plurality of record cards, coding areas defined along coding edges of the cards, a group of coding apertures in each field consisting of three apertures arranged in a single row in spaced parallel relationship to a coding edge of a card, and notches extending from the coding edges of the cards to selected apertures in selected fields for coding the cards with respect to a desired alphabetical classification, said notches comprising wide and narrow notches variously arranged to indicate each of the letters of the alphabet by a different arrangement of notches.

8. A device for coding, sorting and segregating record cards in accordance with a numerical classification comprising a record card, coding areas defined along a coding edge of each card, a group of coding apertures in each field consisting of three apertures arranged in a single row in spaced parallel relationship to the coding edge of the card, and indicia consisting of the numerals "1," "3" and "9" applied to the card in association with and separately identifying the apertures, the edge of the card being notched to indicate various classifications in accordance with a code whereby broad and narrow notches are formed to the various apertures singly and in groups of two and three variously positioned to represent numerical values corresponding to the indicia numerals and the sums of various combinations thereof.

9. The method of coding record cards for sorting and segregating the cards in accordance with an alphabetical classification which comprises defining coding fields upon coding edges of the cards, forming a group of coding apertures in each field consisting of three apertures arranged in a single row in spaced parallel relationship to the coding edge, and variously notching the coding edges of the cards to the coding apertures in accordance with a predetermined code in which notches of narrow and wide widths are formed singly and in selected groups of two and three to indicate different classifications.

10. The method of coding record cards having apertures arranged in groups of three in a single row in spaced parallel relationship to coding edges of the cards which comprises forming narrow notches to selected apertures and forming wide notches to other selected apertures, and varying the widths and positions of the notches in the selected groups for indicating different classifications.

References Cited in the file of this patent
UNITED STATES PATENTS

| Number | Name | Date |
| --- | --- | --- |
| 1,702,994 | Buckeridge | Feb. 19, 1929 |
| 2,181,165 | Andrews | Nov. 28, 1939 |
| 2,289,380 | Nevin | July 14, 1942 |